United States Patent
Leu et al.

(10) Patent No.: US 8,863,056 B2
(45) Date of Patent: Oct. 14, 2014

(54) INTEGRATED DESIGN-FOR-MANUFACTURING PLATFORM

(75) Inventors: Iyun Kevin Leu, Hsin-Chu (TW); Yun Yong Shen, Jhubei (TW); Greg Chang, Dongshih (TW)

(73) Assignee: Taiwan Semiconductor Manufacturing Company, Ltd., Hsin-Chu (TW)

( * ) Notice: Subject to any disclaimer, the term of this patent is extended or adjusted under 35 U.S.C. 154(b) by 1183 days.

(21) Appl. No.: 11/844,186

(22) Filed: Aug. 23, 2007

(65) Prior Publication Data
US 2009/0055011 A1 Feb. 26, 2009

(51) Int. Cl.
*G06F 9/455* (2006.01)
*G06F 17/50* (2006.01)

(52) U.S. Cl.
CPC ............ *G06F 17/50* (2013.01); *G06F 2217/12* (2013.01)
USPC .............. 716/112; 716/52; 716/110; 716/111

(58) Field of Classification Search
USPC ...................................................... 716/4, 19
See application file for complete search history.

(56) References Cited

U.S. PATENT DOCUMENTS

| | | | |
|---|---|---|---|
| 5,539,652 A | 7/1996 | Tegethoff | |
| 6,063,132 A | 5/2000 | DeCamp et al. | |
| 6,407,373 B1 * | 6/2002 | Dotan | 250/201.3 |
| 6,470,489 B1 | 10/2002 | Chang et al. | |
| 6,917,847 B2 | 7/2005 | Littlejohn et al. | |
| 7,100,134 B2 | 8/2006 | Wu et al. | |
| 2003/0229482 A1 * | 12/2003 | Cook et al. | 703/14 |
| 2006/0136860 A1 * | 6/2006 | Boshart et al. | 716/18 |
| 2007/0156379 A1 * | 7/2007 | Kulkarni et al. | 703/14 |
| 2008/0134106 A1 * | 6/2008 | Riviere-Cazaux | 716/2 |
| 2008/0163140 A1 * | 7/2008 | Fouquet et al. | 716/4 |

* cited by examiner

*Primary Examiner* — Jack Chiang
*Assistant Examiner* — Eric Lee
(74) *Attorney, Agent, or Firm* — Slater & Matsil, L.L.P.

(57) ABSTRACT

An integrated design-for-manufacturing (DFM) platform is provided. The integrated DFM platform an automatic warning and verification system; an automatic data feedback and feed forward system; an automatic intellectual property (IP) library management system; and a data management system integrated under a same platform.

19 Claims, 5 Drawing Sheets

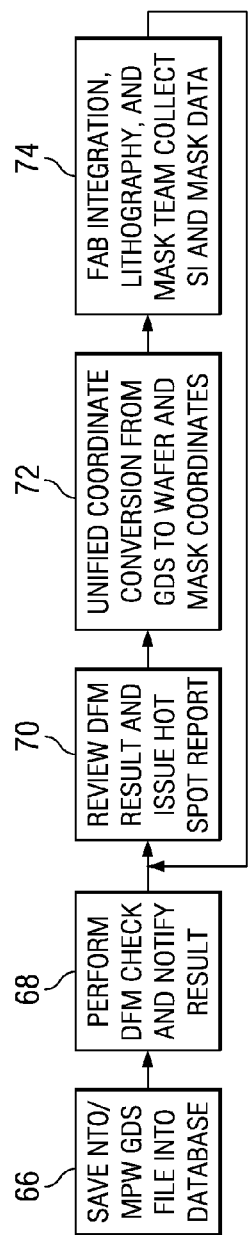

INTEGRATED DESIGN-FOR-MANUFACTURING PLATFORM

TECHNICAL FIELD

This invention relates generally to the manufacturing of integrated circuits, and more particularly to design-for-manufacturing systems.

BACKGROUND

Design-for-manufacturing (DFM) is a developmental practice emphasizing manufacturing issues throughout the product development process. Successful DFM results in lower production cost without sacrificing product quality.

The concept of DFM has been widely adopted in the manufacturing industry, particularly in the manufacturing of integrated circuits. The existing DFM systems, however, are often collections of different systems from different vendors, for example, electrical data analysis (EDA), third party intellectual property (IP) cell platforms, hot spot management systems, failure report systems, and the like. These heterogeneous systems not only cause the reduction in the efficiency of the DFM systems, but also create barriers for the information flow. The identified issues and created actions stored in one system cannot be ported to other related systems. For example, a problem identified in 90 nm technology needs to be manually checked and, if found, fixed in 65 nm technology. There is no mechanism for tracking and ensuring the execution of the problem identification and solution.

Further, DFM models and IP library platforms themselves need to be updated from time to time, such modifications make it necessary for further DFM re-checks using the modified DFM models. In existing DFM systems, the needed DFM re-checks are only identified and initiated manually. Therefore, identifying products related to the modified DFM models and IP libraries is itself a big task, and tracking the progress and the results of the DFM re-checks is an even more daunting one. Accordingly, a DFM system for solving the above-discussed problems is needed.

SUMMARY OF THE INVENTION

In accordance with one aspect of the present invention, an integrated DFM platform includes an automatic warning and verification system; an automatic data feedback and feed forward system; an automatic intellectual property (IP) library management system; and a data management system integrated under a same platform.

In accordance with another aspect of the present invention, an integrated DFM platform includes a database; DFM models; a pattern recognition utility for recognizing hot spot patterns in layouts; a unified coordinate system; and an automation system configured to automatically schedule and/or track a task selected from the group consisting essentially of, upon saving a layout in the database, automatically performing a DFM check on the layout using the DFM models, automatically recognizing hot spot patterns in the layout using the pattern recognition utility, automatically converting coordinates of hot spots found by the DFM check and the pattern recognition utility to wafer coordinates and mask coordinates, automatically notifying testing the hot spots on wafers, and combinations thereof.

In accordance with yet another aspect of the present invention, a method of design-for-manufacturing includes integrating a hot spot warning and verification system, a database, and a data management platform into an integrated DFM platform; and providing an automatic action review track system to automatically schedule and track actions initiated from the integrated DFM platform.

The integrated DFM platform has improved efficiency and can reduce the cycle time for developing and manufacturing integrated circuits.

BRIEF DESCRIPTION OF THE DRAWINGS

For a more complete understanding of the present invention, and the advantages thereof, reference is now made to the following descriptions taken in conjunction with the accompanying drawings, in which:

FIG. 4 illustrates a block diagram of an automation and data feedback/feed forward system;

FIG. 5 illustrates a block diagram of an intellectual property (IP) library check and management system.

DETAILED DESCRIPTION OF ILLUSTRATIVE EMBODIMENTS

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

An integrated design-for-manufacturing (DFM) system is provided, which includes a plurality of functional systems integrated into a single system. The tasks handled by the integrated DFM platform are automated to improve the efficiency and accuracy for tracking the tasks. Data are stored in a data management system and provided for further access.

Figure 1:
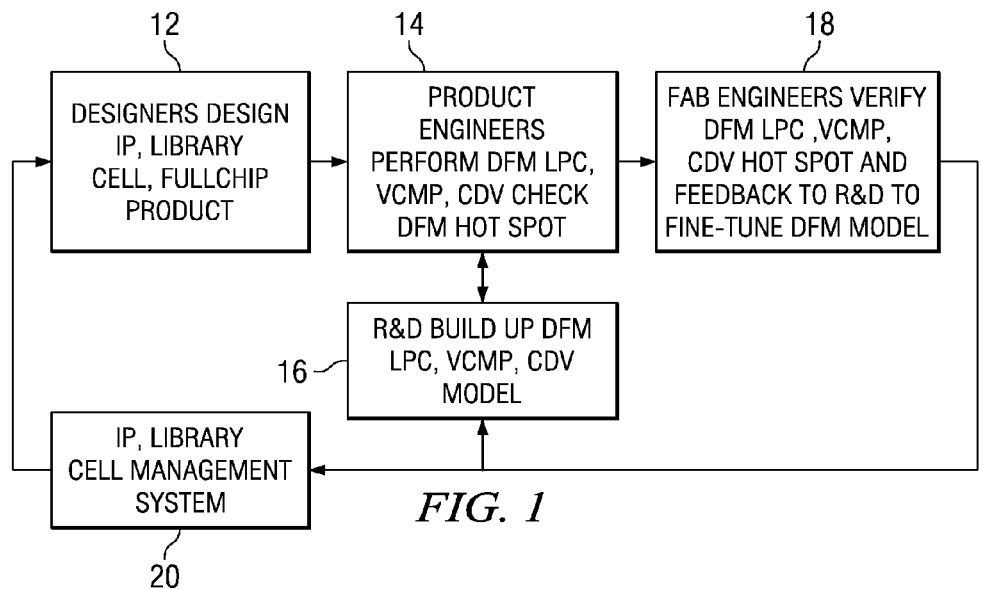
FIG. 1 illustrates sponsors/users of a design-for-manufacturing (DFM) system, and interactions between the sponsors.

FIG. 1 illustrates sponsors of an integrated DFM platform and interactions between the sponsors, wherein the sponsors are also the users of the integrated DFM platform. Accordingly, the interactions between the sponsors are reflected and automated by the DFM system, as will be discussed in detail in subsequent paragraphs. The exemplary interactions between the sponsors are as follows. Designers design intellectual property (IP) libraries (block 12), library cells, and/or full-chip products. The designers may be in-house designers or third-party designers. The designs made by the designers are verified by product engineers, who perform DFM checks including DFM layout patterning check (LPC), virtual chemical mechanical polish (VCMP) check, critical dimension variation (CDV) check, DFM hot spot identification, and the like (block 14). The information collected by the product engineers is provided to research and development (R & D) engineers to build up and update the DFM models (block 16), which models are in return provided to product engineers for DFM checks. Any potential problems identified by the product engineers will be provided to fabrication (Fab) engineers to verify on silicon test wafers (block 18). The data obtained by the product engineers and fab engineers are saved in a library management system (block 20). The intellectual property (IP) and library cells stored in the library management system are accessed by the design engineers for further integrated circuit design.

Figure 2:
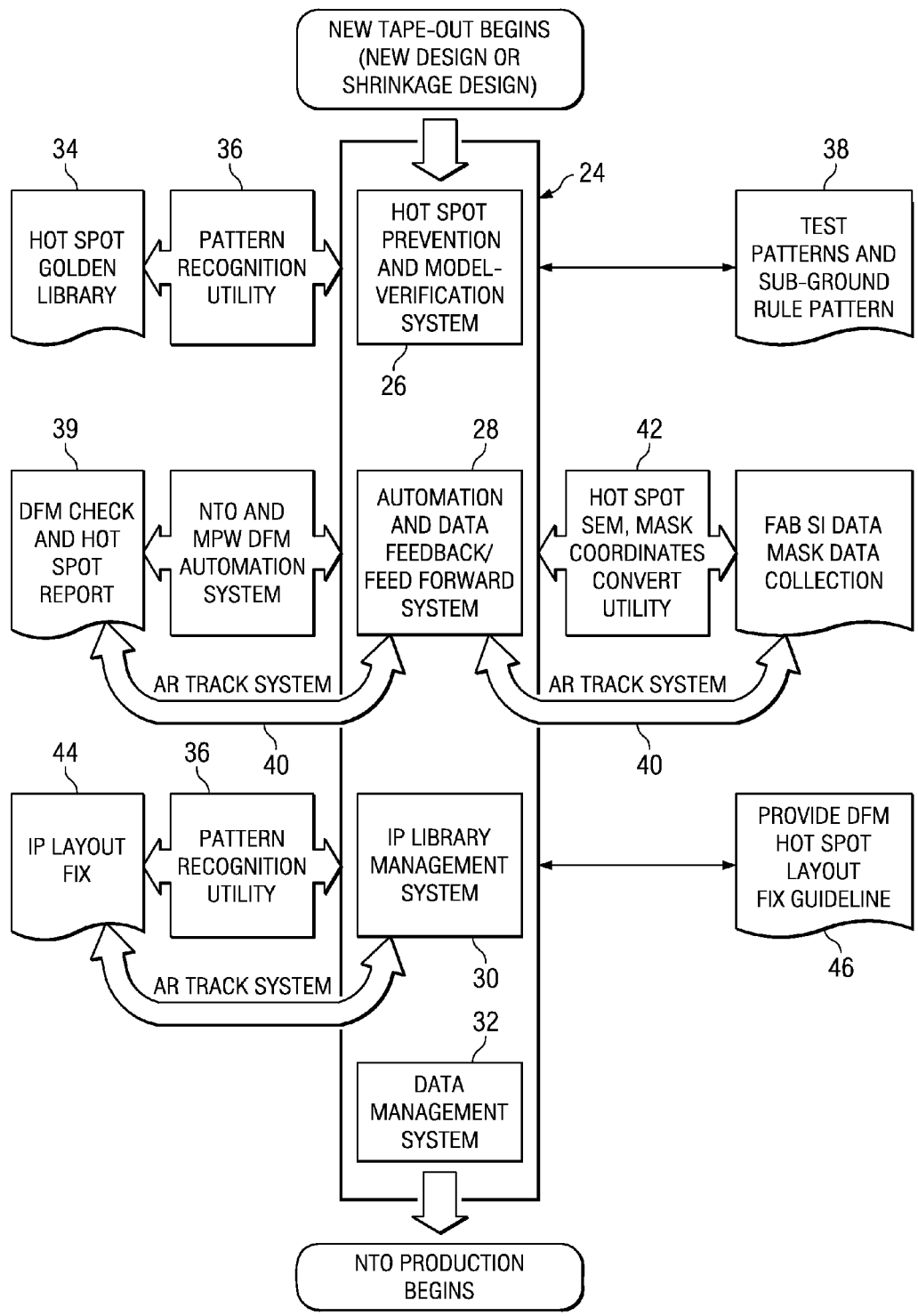
FIG. 2 illustrates a block diagram of an integrated DFM platform, wherein exemplary utilities and operations are also illustrated.

FIG. 2 illustrates a block diagram of integrated DFM platform 24, wherein the functional systems and exemplary functions of the functional systems are illustrated. Preferably, when a new tape-out (NTO) begins, the design (layout) of the NTO is processed by the DFM platform 24, wherein the design included in the NTO may be a new circuit design, or a shrinkage design, which is a shrunk version of an integrated circuit of a greater scale.

Integrated DFM platform 24 includes four functional systems, hot spot prevention and model-verification system 26, automation and data feedback/feed forward system 28, IP library management system 30, and data management system 32. The sponsors illustrated in FIG. 1 all have interactions with the integrated platform 24. Exemplary functions of the functional systems of DFM platform 24 are briefly discussed, and more details of the functional systems are discussed individually.

Hot spot prevention and model-verification system 26 has the function of identifying hot spots and providing warning. As is known in the art, the manufacturing of integrated circuits evolves from generation to generation. A problem identified in an older generation is likely to appear in a newer generation, and hence is referred to as a hot spot. These hot spots are the weak points of the design, and need to be identified and solved. Hot spot prevention and model-verification system 26 includes LPC hot spot golden library 34, which stores the layout pattern of the hot spots. In the preferred embodiment, pattern recognition utility 36 is included in hot spot prevention and model-verification system 26 for recognizing potential hot spot patterns in the design layout using the LPC hot spot golden library 34. Pattern recognition utility 36 includes software programs for processing layout files, which are commonly graphic data system (GDS) files. The potential hot spot patterns, after being identified, are built as test patterns on test wafers to verify whether the potential hot spots are real hot spots or not. Also, sub-ground rule patterns, which include dimensions marginally less than the minimum dimensions, are also built and tested (block 38). The potential hot spots are also identified by running a DFM check using DFM models.

Automation and data feedback/feed forward system 28 is used to automatically transfer information in the DFM system, and automatically initiate actions. For example, saving a new NTO design into a layout database automatically triggers the DFM check and the generation of hot spot reports (block 39). With the issues identified in the DFM check or hot spot pattern recognition utilities, an action is generated by AR track system 40, which will track the progress of the action until the action is finished. AR track system 40 is also referred to as a project management system, and may further have the function of controlling schedules of the actions. Automation and data feedback/feed forward system 28 interacts with a unified coordinate system (block 42) for converting coordinates, for example, converting the coordinates of hot spots in layouts to coordinates in wafers and masks.

IP library management system 30 manages the IP platform, performs DFM checks on the IPs and library cells, and initiates the hot spot fix actions. Again, action items may be generated in the AR track system 40 for fixing the IPs and/or library cells (block 44). Also, DFM hot spot layout fix guidelines are provided to customers to ensure the fix of the hot spots and to prevent the future occurrence of further DFM hot spots (block 46).

The data related to the integrated DFM platform 24 are stored in data management system 32, which has the functions of linking (to other databases or management systems), searching, classifying, and performing statistical analysis. Exemplary data stored in data management system 32 include hot spot data, failure analysis reports, in-line test-line critical dimension data, yields, and the like. Various keys are provided for efficiently searching and classifying the data.

The details of each of the functional systems 26, 28, 30, and 32 are discussed as follows. It is noted that steps or functions discussed in one functional system may appear in other functional systems since functional systems 26, 28, 30, and 32 are tightly integrated.

1. Hot Spot Prevention and Model-verification System

Figure 3:
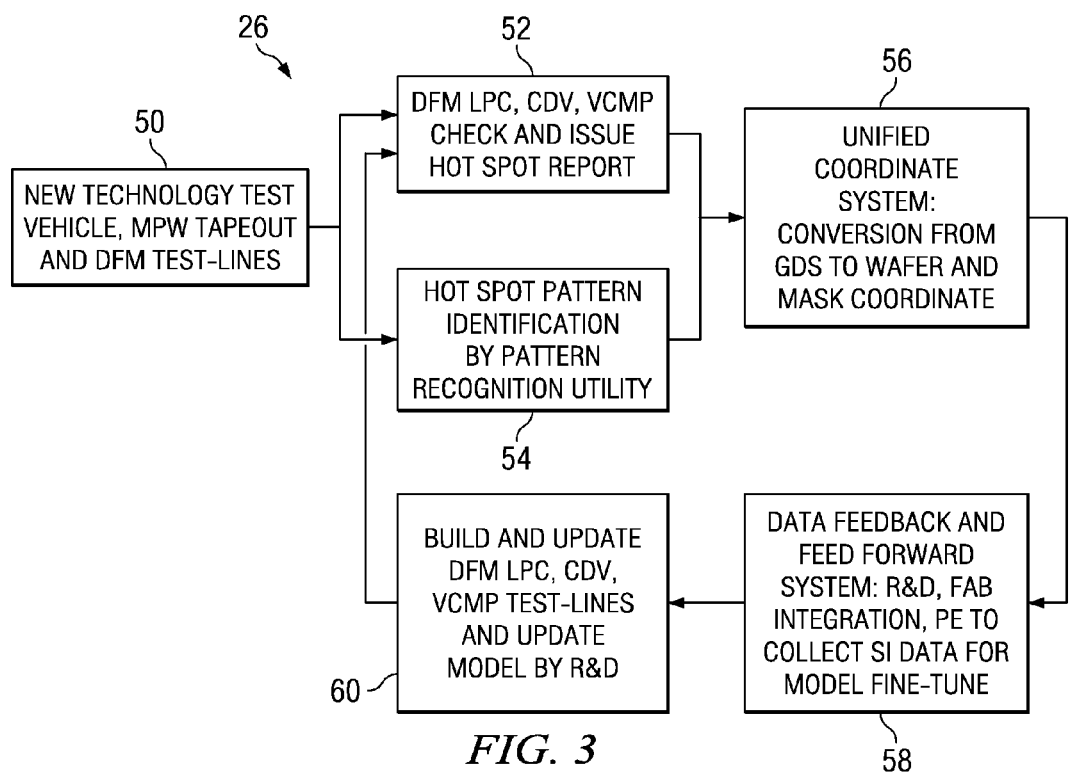
FIG. 3 illustrates a block diagram of a hot spot prevention and model-verification system.

FIG. 3 illustrates a block diagram of hot spot prevention and model-verification system 26. Typically, to reduce the cost of testing, multi-purpose wafers (MPW) are designed to include a plurality of test chips having different designs, which may come from different customers. By using MPWs, a plurality of test patterns may be manufactured and tested simultaneously. Conventionally, the test patterns are formed in the test chips. A drawback of forming test patterns in the test chips is that from generation to generation, the design and allocation of the test chips change, and it may not be easy to allocate locations through many generations of MPWs for a test pattern. However, the scribe lines between the test chips in MPWs were conventionally not used. In the preferred embodiment, test-lines, which include the test patterns such as the patterns of hot spots, are formed within scribe lines. An advantageous feature of DFM test-lines is that the scribe lines are always available, and the shapes of the scribe lines are relatively stable, and it is thus easy to form test-lines on MPWs through many technology generations.

Referring to FIG. 3, tape-outs of test patterns of new technologies (also referred to as test vehicles), MPWs and test-lines are provided, and may be saved in a database (50). DFM checks are then performed against the tape-outs (52). Exemplary DFM checks include DFM LPC checks, DFM CDV checks, DFM VCMP checks, and the like. If hot spots are identified, hot spot reports are generated. Additionally, pattern recognition utilities are used to identify patterns of hot spots in the tape-outs (54). The pattern recognition utilities are particularly helpful before the DFM models are fully tested since the pattern recognition utilities can be used as a base for identifying problems in order to improve the DFM models. After hot spots are identified, the unified coordinate system is used to automatically identify the locations of the hot spots by converting the coordinates between layouts (which are in the format of GDS), and wafer coordinates and mask coordinates. Since one NTO or MPW may have multiple hot spots, the automatic coordinate conversion significantly improves the efficiency in the conversion of coordinates. In step 58, the results of steps 52, 54, and 56 are accessed by automation and data feedback/feed forward system 28 (refer to FIG. 2) and fed to different sponsors of the integrated DFM platform, as is illustrated in FIG. 1.

The results of the tests performed on wafers (often referred to silicon results) may have a mismatch with the DFM models. For example, some hot spots identified by the DFM check may not be problems, while some other minor hot spots are proven to be serious. Accordingly, the DFM models need to be modified (step 60) to accurately reflect the silicon results. After the modification of the DFM models, the NTO or MPW tape-out needs to be DFM re-checked using the modified DFM models.

Advantageously, steps 52, 54, and 56 are automatically performed upon the saving of the NTO or MPW design into the layout database, and are performed without human intervention. Instead of sending emails to the relative personnel and waiting for the work to be finished, the integrated DFM platform performs the work automatically. This reduces the manpower and the cycle time for the tasks.

2. Automation and Data Feedback/Feed Forward System 28

FIG. 4 illustrates a block diagram of automation and data feedback/feed forward system 28. This system handles the automation of the integrated DFM platform. Some of the actions initiated by the automation and data feedback/feed forward system 28 are also described in the description of functional systems 26 and 30. In the preferred embodiment, when a design file (for example, a GDS file of a NTO or a MPW) is saved into the layout database (step 66, wherein the layout database may be an IP platform or full-chip design database), the DFM check is automatically performed by the integrated DFM platform (step 68, please also refer to step 52 in FIG. 3). The DFM checks preferably include LPC check, VCMP check, CDV check, and the like. The DFM system then automatically sends an AR request to product engineers to review the DFM check results. With the agreement of the product engineers, hot spot reports will be issued upon the review reports saved into the integrated DFM platform by the product engineers (step 70). Preferably, the AR request is managed by AR track system 40 (refer to FIG. 2), which also handles the scheduling, reminding, report generating, and the like.

Next, upon finishing the hot spot review by product engineers, automation and data feedback/feed forward system 28 initiates the automatic conversion of coordinates (step 72, please also refer to block 56 in FIG. 3). Again, upon finishing the automatic coordinate conversion, fab engineers may fabricate wafers, which may be MPWs or mass-production wafers. Further upon finishing fab tests and saving silicon results, automation and data feedback/feed forward system 28 automatically generates an AR request to feedback to the product engineers (note an arrow pointing from step 74 to step 70).

Automation and data feedback/feed forward system 28 not only performs the work that is conventionally performed by humans, but also provides an event-driven work process, so that the work efficiency is maximized, and the cycle time minimized.

3. IP Library Management System 30

FIG. 5 illustrates a block diagram of IP library management system 30. After a library cell or an IP (referred to as IP/library cell hereinafter, wherein the term "IP" is a term of art and commonly refers to library cells with greater sizes than typical library cells, although the terms IP and library cells are also used interchangeably) is designed or provided by either in-house designers or third-party designers and saved in the IP platform (step 78, please also refer to step 68 in FIG. 4 and step 52 in FIG. 3), the DFM checks are performed on the saved IP/library cell (step 80). The exemplary DFM checks include LPC checks, CDV checks, and the like. The results of the DFM checks are saved in the data management system 32 (step 82, also refer to FIG. 2). Track records are also created for each of the IP/library cell. For example, if hot spots are identified, IP library management system 30 will create a record and record the version number of the corresponding IP/library cell. The record is kept activated, and preferably an action request is made through the AR track system, until the version number of the IP/library cell is changed to a greater number, indicating a modification of the corresponding IP/library cell. The track record may then be cleaned. Further, if the IP/library cell is not DFM compliant, a guideline may be sent to the designer of the IP/library cell, reminding him/her of the potential risk of being DFM non-compliant.

Assuming upon the notification of being DFM non-compliant, designers changed the design of the IP/library cell, a DFM re-check is then needed to make sure that the updated IP/library cell is DFM-compliant (step 84). Steps 80, 82, and 84 are preferably repeated until the IP/library cell is DFM-compliant.

Designers of the IP/library cell may determine to revise the IP/library cell (step 86), for example, in order to improve its performance. Upon the revising of the IP/library cell, IP library management system 30 automatically initiates a DFM re-check on the updated IP/library cell. Again, the updated IP/library cell is preferably re-checked until it is DFM-compliant.

In the case the DFM model, including DFM LPC model, DFM VCMP model and DFM CDV model, is revised (step 88, please refer to step 60 in FIG. 3), DFM re-check is automatically initiated. Preferably, all IP/library cells related to the modified DFM model and saved in the IP platform are re-checked. Again, the DFM re-check will be repeatedly performed until DFM-compliant test passes.

4. Data Management System 32

Figure 6:
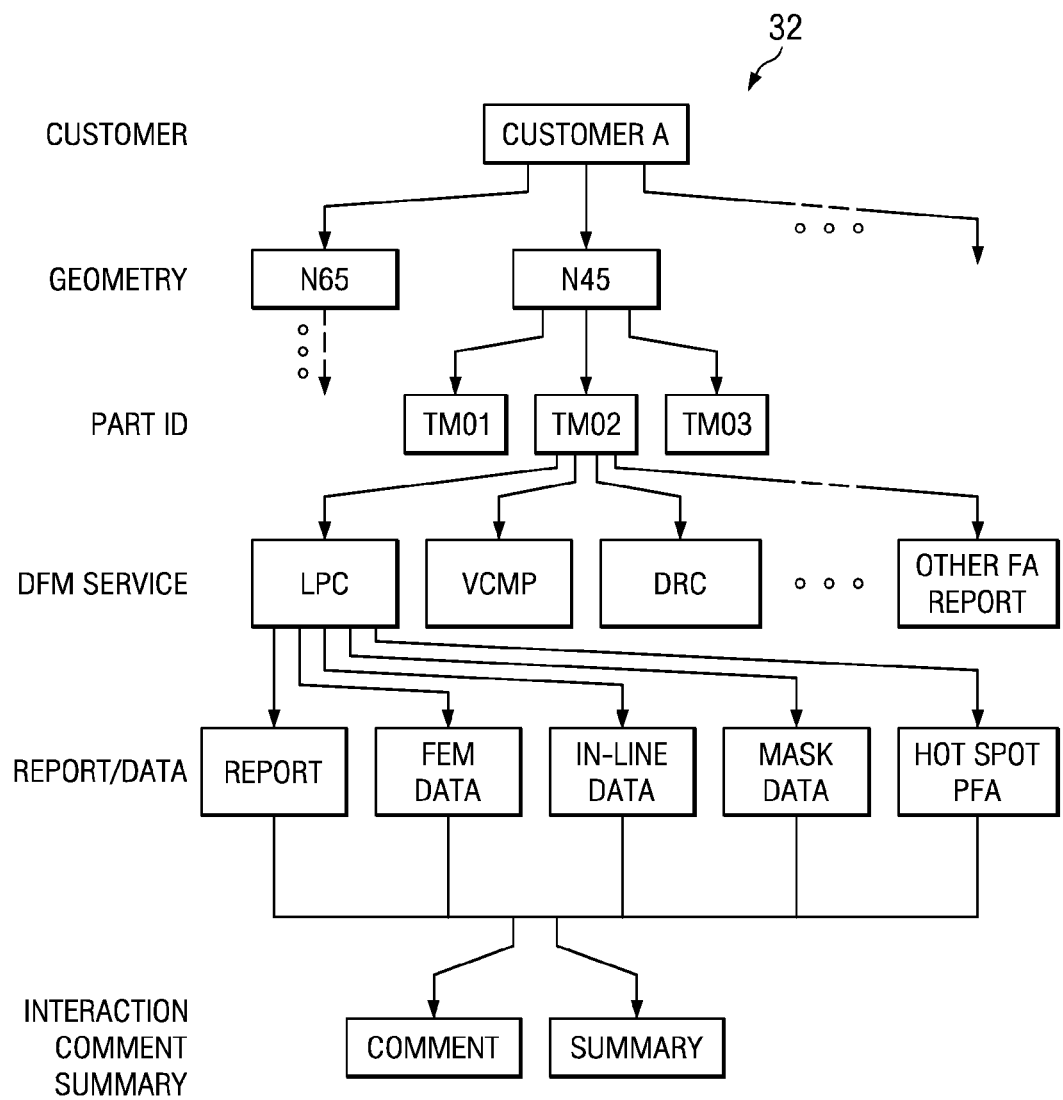
FIGS. 6 and 7 illustrate exemplary data stored in data management system, wherein different keys are used.

FIG. 6 illustrates example data stored in data management system 32. For example, for each customer, the corresponding geometry (also referred to as technology generation), part ID, the DFM services (LPC, VCMP, and design rule check (DRC)) and the corresponding results and reports, are stored.

Figure 7:
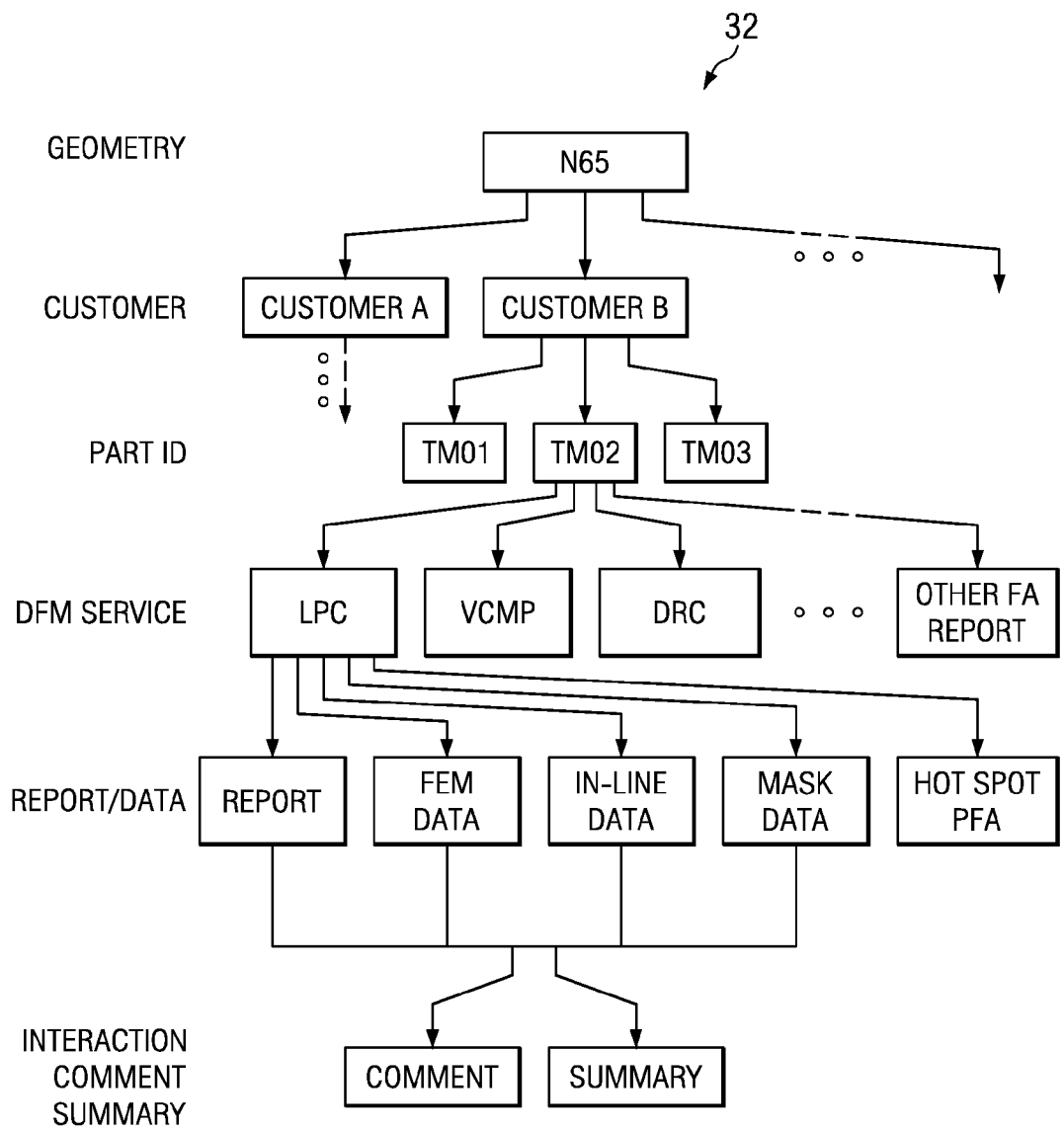

Data management system 32 is capable of being searched through various keys, for example, customer ID, geometry, IP cell, failure analysis mode, and the like. This provides significant flexibility for designers to predict and identify possible error patterns. For example, certain customers are prone to certain types of hot spots or design problems. With different keys provided, such customized information may be retrieved more efficiently. FIG. 7 illustrates a further exemplary data structure in data management system 32.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, and composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. An integrated design-for-manufacturing (DFM) platform comprising:
  an automatic warning and verification system comprising a unified coordinate system for converting between layout coordinates, wafer coordinates, and mask coordinates;
  an automatic data feedback and feed forward system configured to:
    automatically initiate an automatic DFM check in response to a step of saving a layout in a layout database, wherein the DFM check comprises a layout patterning check (LPC), a virtual chemical mechanical polish (VCMP) check, or a critical dimension variation (CDV) check;

generate a DFM check result; and send a review notice for reviewing the DFM check result;

an automatic intellectual property (IP) library management system; and a data management system, wherein the automatic warning and verification system, the automatic data feedback and feed forward system, the automatic IP library management system, the data management system, and the unified coordinate system are integrated under a same platform.

2. The integrated DFM platform of claim 1, wherein the automatic warning and verification system comprises a hot spot pattern recognition utility for determining the layout coordinates of hot spots.

3. The integrated DFM platform of claim 2, wherein the hot spot pattern recognition utility comprises a software program.

4. The integrated DFM platform of claim 1, wherein the automatic warning and verification system is configured to perform DFM checks.

5. The integrated DFM platform of claim 1, wherein the automatic data feedback and feed forward system is configured to, upon a review of the DFM check result, automatically start a unified coordinate system for converting graphic data system (GDS) coordinates of a hot spot to wafer coordinates and mask coordinates.

6. The integrated DFM platform of claim 5, wherein the automatic data feedback and feed forward system is configured to generate an action review item for fabrication engineers.

7. The integrated DFM platform of claim 1, wherein the automatic IP library management system comprises track records of IP/library cells.

8. The integrated DFM platform of claim 1, wherein the automatic IP library management system is configured to perform a DFM check on IP/library cells.

9. The integrated DFM platform of claim 1, wherein the automatic IP library management system is configured to automatically perform a DFM re-check on saved IP/library cells upon a revision of a DFM model.

10. The integrated DFM platform of claim 1, wherein the automatic IP library management system is configured to automatically perform a DFM re-check on an IP/library cell upon a modification of the IP/library cell.

11. The integrated DFM platform of claim 1 further comprising an action review track system for schedule-controlling and action-tracking.

12. An integrated design-for-manufacturing (DFM) platform comprising:

a database;

a pattern recognition utility for recognizing hot spot patterns in layouts;

a unified coordinate system for converting between layout coordinates, wafer coordinates, and mask coordinates; and an automation system configured to automatically schedule and track at least one of the following tasks:

in response to a step of saving a layout in the database, automatically initiating a DFM check on the layout using DFM models wherein the DFM check comprises a layout patterning check (LPC), a virtual chemical mechanical polish (VCMP) check, or a critical dimension variation (CDV) check, and modifying the DFM models, and upon the modifying of the DFM models, automatically performing a DFM re-check on IP/library cells in the database.

13. The integrated DFM platform of claim 12, wherein the database is a layout database of new tape-outs (NTO) and multi-purpose wafers (MPW).

14. The integrated DFM platform of claim 13, wherein the layout saved in the database comprises a DFM test-line.

15. The integrated DFM platform of claim 12, wherein the automation system is further configured to perform at least one of the following tasks:

automatically recognizing the hot spot patterns in the layout using the pattern recognition utility, automatically converting the layout coordinates of the hot spot patterns found by the DFM check and the pattern recognition utility to the wafer coordinates and the mask coordinates, and automatically sending a notification for initiating testing the hot spots on wafers.

16. The integrated DFM platform of claim 15, wherein the automation system is further configured to automatically schedule and track a task of:

upon revising an IP/library cell, performing a DFM re-check on the IP/library cell.

17. The integrated DFM platform of claim 12, wherein the DFM models comprise a model selected from the group consisting essentially of a layout patterning check (LPC) model, a virtual chemical mechanical polish (VCMP) model, a critical dimension variation (CDV) model, and combinations thereof.

18. An integrated design-for-manufacturing (DFM) platform comprising:

an automatic warning and verification system;

an automatic data feedback and feed forward system;

an automatic intellectual property (IP) library management system configured to automatically perform a DFM re-check on saved IP/library cells upon a revision of a DFM model wherein the DFM re-check comprises a layout patterning check (LPC), a virtual chemical mechanical polish (VCMP) check, or a critical dimension variation (CDV) check; and a data management system, wherein the automatic warning and verification system, the automatic data feedback and feed forward system, the automatic IP library management system, and the data management system are integrated under a same platform.

19. The integrated DFM platform of claim 18, wherein the automatic IP library management system is configured to automatically perform a DFM re-check on an IP/library cells upon a modification of the IP/library cells.

* * * * *